United States Patent
Pauly et al.

(10) Patent No.: US 6,573,914 B1
(45) Date of Patent: Jun. 3, 2003

(54) METHOD AND APPARATUS FOR USING A SCRATCH PAD IN A GRAPHICAL USER INTERFACE FOR AVIONICS EQUIPMENT

(75) Inventors: Martin Pauly, Cedar Rapids, IA (US); Matthew T. Smith, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/503,564

(22) Filed: Feb. 14, 2000

(51) Int. Cl.[7] ............................. G06F 3/00; G06F 19/00
(52) U.S. Cl. ..................... 345/769; 345/780; 345/767; 345/168; 701/14; 701/3
(58) Field of Search ............................. 345/769, 780, 345/767, 770, 840, 771, 773, 835, 168, 172; 701/3, 14, 36; 707/507, 505, 530, 539; 715/505, 507, 530, 539

(56) References Cited

U.S. PATENT DOCUMENTS

| | | | |
|---|---|---|---|
| 5,416,705 A | * | 5/1995 | Barnett ....................... 701/14 |
| 5,715,163 A | * | 2/1998 | Bang et al. ................ 701/14 X |
| 5,752,254 A | * | 5/1998 | Sakairi ........................ 707/530 |
| 5,916,297 A | * | 6/1999 | Griffin, III et al. ........ 701/14 X |
| 6,112,141 A | * | 8/2000 | Briffe et al. .................. 701/14 |
| 6,346,892 B1 | * | 2/2002 | DeMers et al. ........... 701/14 X |
| 6,414,699 B1 | * | 7/2002 | Pittore .................... 345/769 X |

* cited by examiner

Primary Examiner—Raymond J. Bayerl
(74) Attorney, Agent, or Firm—Nathan O. Jensen; Kyle Eppele

(57) ABSTRACT

An apparatus and method for entering data into an avionics system which uses a large multi-functional display, with a graphical user interface, which is capable of direct data entry into pre-selected fields and further includes a scratch pad for temporarily storing data prior to entry into a later selected data field. The scratch pad is capable of receiving stacked data items as well as automatically distributing compound data items to their appropriate display fields.

17 Claims, 2 Drawing Sheets

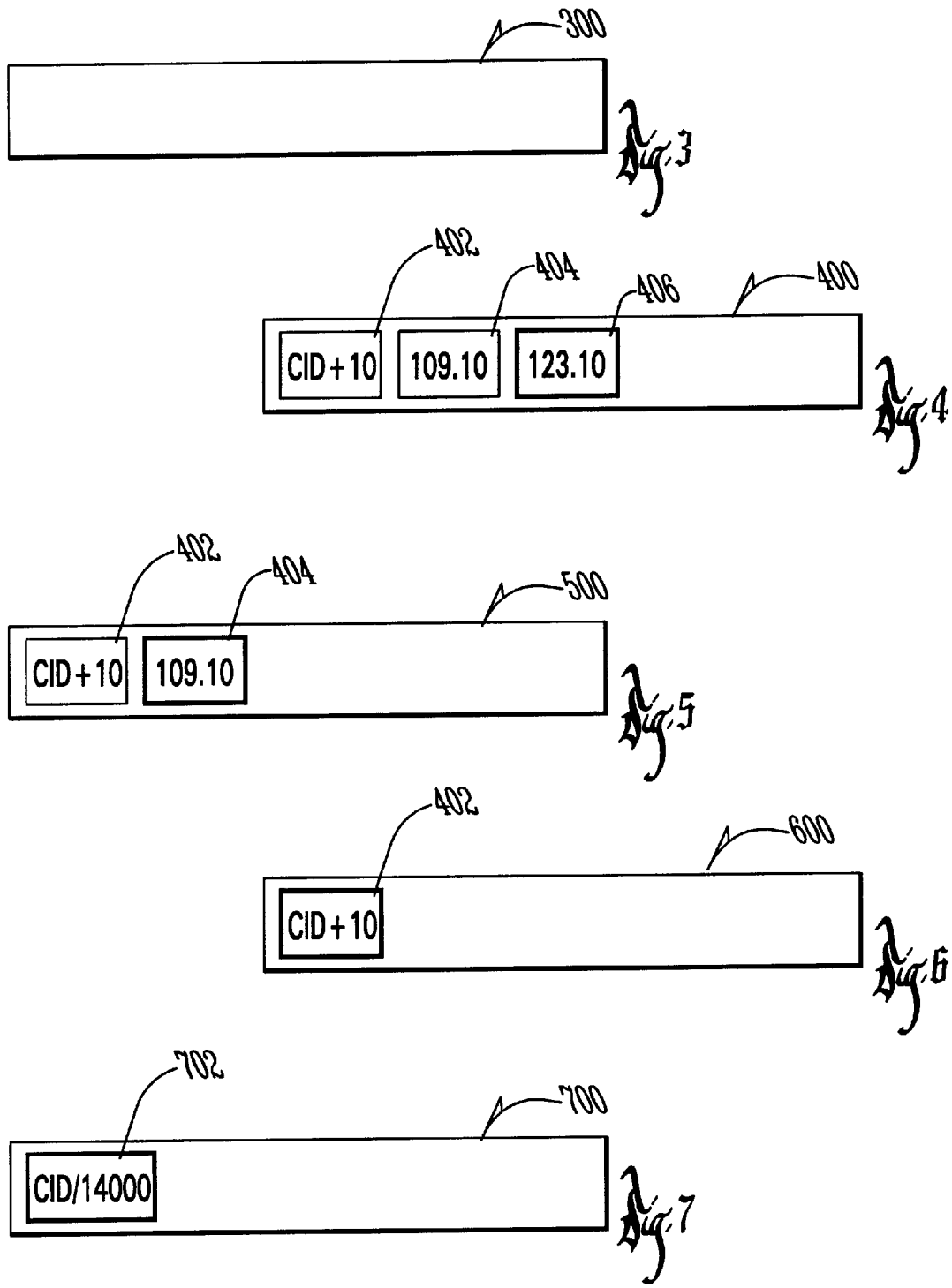

METHOD AND APPARATUS FOR USING A SCRATCH PAD IN A GRAPHICAL USER INTERFACE FOR AVIONICS EQUIPMENT

FIELD OF THE INVENTION

The present invention generally relates to avionics, and more particularly relates to avionics displays having a graphical user interface.

BACKGROUND OF THE INVENTION

In the past, designers of avionics displays and flight computer systems have endeavored to achieve a reduction in pilot workload. One area of concern has been the FMS, which typically requires a significant amount of "heads-down" time. This "heads-down" time occurs when the pilot is neither looking at the primary flight displays nor out the wind screen, but instead is focused upon a task in an oblique direction, such as when using a typical FMS control display unit (CDU), which has an integrated keyboard and a textual display unit. One approach has been proposed in which a large multi-functional display, disposed in front of the pilot, is used for both viewing FMS information, as well as data input through a cursor. In some prior art applications, in an attempt to save time and reduce the workload on the pilot, direct textual entry into a target field on the display is permitted. This is quite like the typical graphical. user interface (GUI) for a personal computer, where data is entered into a target field directly; i.e., as each letter is entered, it is displayed on the screen. However, this is significantly different from the prior art method of typical CDUs. CDUs typically enter data into a scratch pad and when the entire data string is completed, an appropriate line select key is pressed, thereby inserting data into the adjacent target field. The direct textual insertion approach has an advantage that it does not require locating a line select key after the data is entered. However, it does have some drawbacks. For example, if the data to be entered is being received by the pilot over a radio, and the pilot is being given several types of information to be input into the various avionics equipment, such as for radio tuning, FMS, maintenance synoptics and others, it may be too much information coming too rapidly for the pilot to first find the target fields and then enter the data in those fields. The pilot may make errors or need to request that the information be repeated. This can add extra pilot workload, which is contrary to the primary objective.

Consequently, there exists a need for improved methods and apparatuses for entering data into a target field in an avionics display system.

SUMMARY OF THE INVENTION

It is an object of the present invention to provide an improved avionics system with a GUI.

It is a feature of the present invention to include a scratch pad feature in the GUI.

It is an advantage of the present invention to give the pilot enhanced flexibility methodologies available to enter data.

It is another feature of the present invention to include a data input selection option which permits both direct textual entry and entry of data through a scratch pad.

It is an advantage of the present invention to reduce pilot workload by reducing the need for the pilot to request that information be repeated because the pilot was too busy looking for the appropriate target fields into which to enter the data directly.

The present invention is a GUI apparatus and method for simultaneously availing to the pilot both direct textual entry into target fields and use of a scratch pad, which is designed to satisfy the aforementioned needs, provide the previously stated objects, include the above-listed features, and achieve the already articulated advantages.

Accordingly, the present invention is an avionics display having a GUI and an associated scratch pad.

BRIEF DESCRIPTION OF THE DRAWINGS

The invention may be more fully understood by reading the following description of the preferred embodiments of the invention, in conjunction with the appended drawings wherein:

FIG. 3 is a representation of an avionics display of the present invention showing an empty scratch pad.

FIG. 4 is a representation of an avionics display of the present invention showing the scratch pad of FIG. 3 after three data items have been entered.

FIG. 5 is a representation of an avionics display of FIG. 4 after one of the data items has been moved to a target field.

FIG. 6 is a representation of an avionics display of FIG. 5 after one of the data items has been moved to a target field.

FIG. 7 is a representation of an avionics display of a scratch pad having two data items separated by a slash.

DETAILED DESCRIPTION

Figure 1:
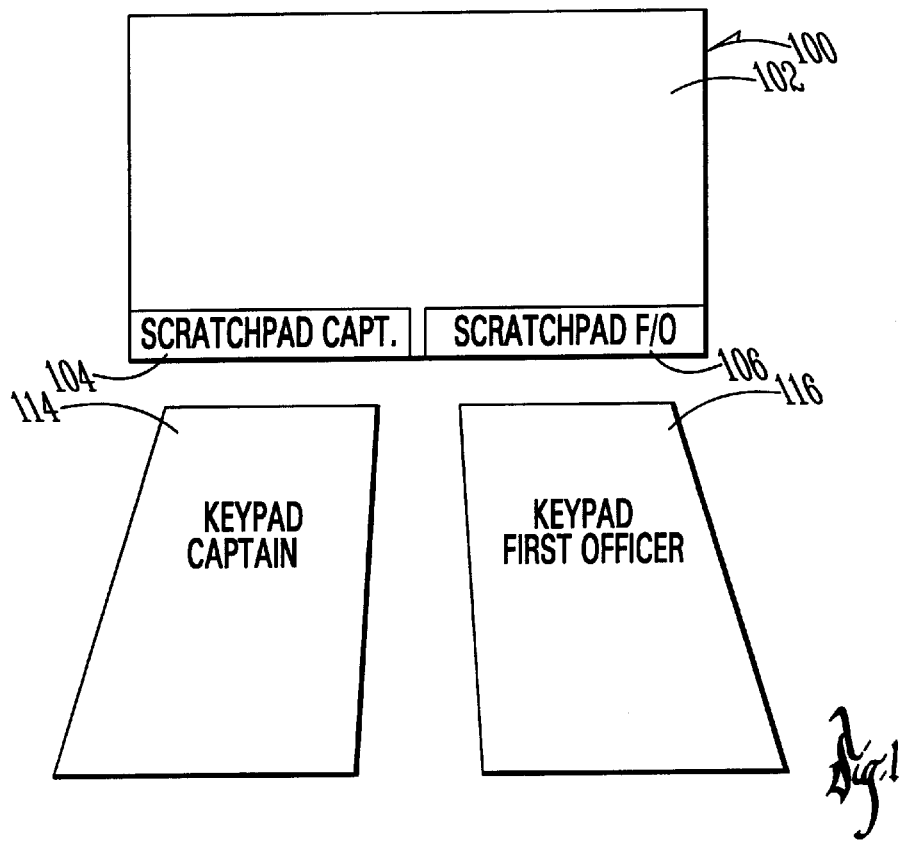
FIG. 1 is a representation of an avionics display of the present invention, showing a multi-functional display and keyboards for the captain and the first officer.

Now referring to the drawings wherein like numerals refer to like matter throughout, there is shown in FIG. 1 a display of the present invention, generally designated 100, having a multifunctional display 102, with a captain's scratch pad 104 and a first officer's scratch pad 106, disposed thereon to conveniently display scratch pad information to the appropriate crew member. Also shown is a captain's keypad 114 and a first officer's key pad 116. The precise location of captain's scratch pad 104 and first officer's scratch pad 106 with respect to captain's keypad 114 and first officer's key pad 116 is a matter of designer's choice; the above-described arrangement is believed to be a preferred approach. Multi-functional display 102 is not shown having a plurality of line select keys LSKs around the periphery of the display. Such an arrangement of LSKs is well known in the prior art for control display units CDUs. The multi-functional display 102 is preferred to be much larger in viewing area in comparison to the typical prior art CDU display.

Figure 2A:
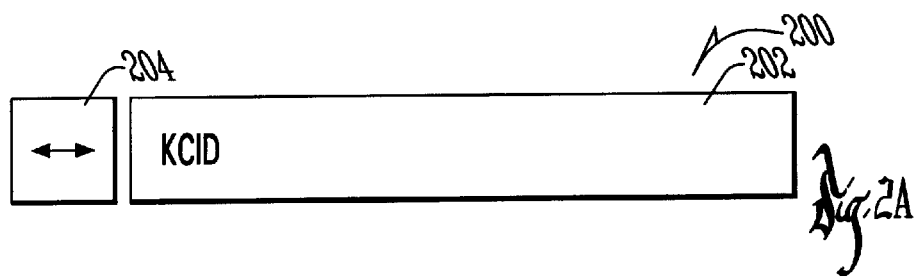
FIG. 2A is a representation of an avionics display data field of the present invention, which is shown to be a read-write data field.

Now referring to FIG. 2A there is shown a representative view of a portion of a multi-functional display 102 including a target data field generally designated 200, including a data field 202 and a read-write indicator/graphically generated line select key 204. This read-write indicator/graphically generated line select key 204 can be used instead of the prior art LSKs typically associated with prior art CDUs. Additionally, the read-write indicator/graphically generated line select key 204 provides helpful information about the permissible direction of dataflow with respect to the particular data field 202. Read-write indicator/graphically generated line select key 204 shows that data field 202 is capable of both reading and writing information. In contrast to read-write indicator/graphically generated line select key 204, and now referring to FIG. 2B, there is shown an alternate embodiment of a portion of multi-functional display 102, generally designated 210, which includes an alternate type of data field 202 which is designated by read-only indicator/graphically generated line select key 214, which identifies data field 202 to be a read-only type of data field. Both read-write indicator/graphically generated line select key 204 and read-only indicator/graphically generated line select key 214 can behave as a typical LSK if they are selected by the users with a cursor device.

Figure 2B:
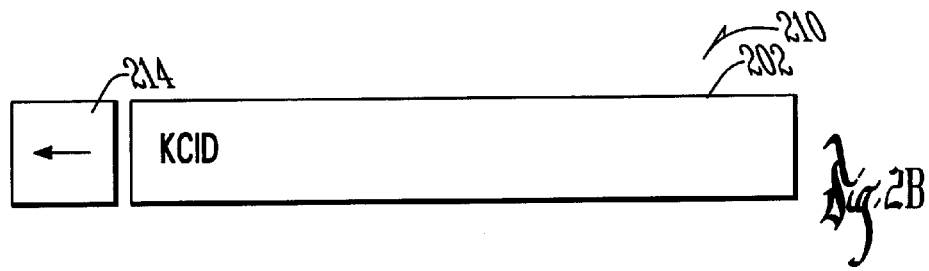
FIG. 2B is a representation of an avionics display data field of the present invention, which is shown to be a read-only data field.

Now referring to FIGS. 1, 2A and 2B, it can be readily seen that a pilot has two distinct possible methods of entering data into a target data field.

First of all, the pilot moves the cursor by operation of a track ball on a cursor control panel or other cursor control device. The cursor is moved to the target data field. When this data field has been selected, either by clicking, auto selection or other means, upon the target data field 202, subsequent keystrokes on the captain's keypad 114 are directly appended to the selected target data field 202. This direct data insertion is similar to prior art methods of directly entering data. The process is terminated by pressing an ENTER key or a CANCEL key, depending upon whether the pilot approves of the data directly entered into the target data field.

When the captain's keypad 114 or first officer's key pad 116 is used without a prior selection of a target data field 202, then the data entered is displayed and stored in the captain's scratch pad 104 or first officer's scratch pad 106 respectively. When the captain is finished entering data into the captain's scratch pad 104, then he can move the cursor to a target data field 202 and click on the read-write indicator/graphically generated line select key 204. The read-write indicator/graphically generated line select key 204 indicates that the target data field 202 can both accept data from the scratch pad (write) or can copy its data to the scratch pad (read).

The pilot is allowed to read information from the data field 202 and transfer it to the scratch pad. This can be done by selecting either a read-write indicator/graphically generated line select key 204 or a read-only indicator/graphically generated line select key 214. With the information now in the scratch pad, the pilot can now move it to another target data field having a read-write indicator/graphically generated line select key 204.

Now referring to FIGS. 3, 4, 5, and 6, another feature of the present invention is described which involves a stacking of data. In prior art CDUs, a selection of an LSK results in moving the entire data in the scratch pad to the selected data field. The present invention allows for multiple data items to accumulate in the scratch pad. The values then can be distributed one by one to their respective target data fields. This approach will make it much easier to store parameters received by a radio transmission (e.g. new flight plan waypoints, crossing altitude and new radio frequencies) and then distribute the data to the appropriate target data fields. FIG. 3 shows an empty scratch pad 300, which represents the status before any data is entered. FIG. 4 shows a scratch pad 400 showing three separate data items. Scratch pad having three data items 400 includes first data item 402, second data item 404, and third data item 406, which is shown as being highlighted due to a selection of this data item by the pilot. Third data item 406 is shown as the topmost data item, which is the data item that will be moved to a target data field. The data items can be reordered. This is done by highlighting them, which automatically moves them to the topmost location. With the desired item highlighted, third data item 406, the pilot can select a target data field, such as data field 202 and click on the read-write indicator/graphically generated line select key 204. This will result in third data item 406 being moved to data field 202. Third data item 406 is then removed from the scratch pad having three data items 400 and the display. Thereafter, the display would be represented by FIG. 5, which includes a scratch pad having two data items 500. Now second data item 404 is shown as highlighted. The process of moving the data from scratch pad having two data items 500 is repeated, and second data item 404 is moved to a target data field. FIG. 6 shows a scratch pad having one data item 600 with first data item 402 therein. If the data transfer process is repeated, the display will return to empty scratch pad 300 of FIG. 3.

Now referring to FIG. 7, there is shown another feature of the present invention which allows compound data items to be moved to target fields. Scratch pad having compound parameters as data items 700 is shown with a compound parameter as a data item 702. This compound parameter approach is similar to the stacking approach as described above and shown in FIGS. 3–6, except that the compound scratch pad contents are analyzed by the avionics systems and are automatically sent to the appropriate target fields. A syntax of acceptable compound data items must be employed. One example would be where the segments are separated by slashes and ordered, such as:—waypoint/altitude/speed—. Other syntax could be employed. Compound parameter as a data item 702 would be recognized by the system as a new waypoint (CID) and a new altitude (14000). These components of compound parameter as a data item 702 would be automatically distributed to the appropriate target fields, thereby reducing pilot workload.

Throughout this description, reference has been made to a pilot. This is merely a convenience; it is intended that the present invention would apply to any crew member.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:
1. An avionics system comprising:
 a multi-functional display having thereon a graphical user interface with a plurality of data fields for displaying predetermined aviation information, said multi-functional display further having a read-write indicator/graphically generated line select key displayed thereon;
 a keypad for directly entering data into a first of said plurality of data fields; and,
 a scratch pad, coupled to said key pad, for staging aviation information entered through said keypad, but not directly entered into any of said plurality of data fields.
2. An avionics system of claim 1 wherein said scratch pad receives data from said keypad when said plurality of data fields are not selected for direct data entry.
3. An avionics system of claim 1 wherein said keypad directly enters data fields has been selected for direct data entry.

4. An avionics system of claim 1 wherein said scratch pad receives data from said first of said plurality of data fields.

5. An avionics system of claim 1 wherein said scratch pad writes data to said first of said plurality of data fields.

6. An avionics system of claim 1 wherein said scratch pad receives a stack of data items and distributes said stack to said plurality of data fields.

7. An avionics system of claim 6 wherein said stack of data items is distributed in accordance with a user selectable order of distribution.

8. An avionics system of claim 1 wherein said scratch pad receives a compound data item having a plurality of segments therein relating to a plurality of predetermined aviation parameters, whereby said plurality of segments of said compound data item are automatically distributed to said plurality of data fields, in accordance with a predetermined syntax.

9. An avionics system of claim 1 wherein said avionics display is a CDU display.

10. An avionics system of claim 9 wherein said scratch pad receives a compound data item having a plurality of segments therein relating to a plurality of predetermined aviation parameters, whereby said plurality of segments of said compound data item are automatically distributed to said plurality of data fields, in accordance with a predetermined syntax.

11. An avionics system of claim 1 wherein said display has a periphery region which has a plurality of manually manipulated line select keys disposed therein.

12. A method of entering aviation information into an avionics system, of the type having a multi-functional display comprising the steps of:

displaying a read-write indicator/graphically generated line select key on the multi-functional display;

providing a keypad to enter data;

providing a scratch pad to receive data; and, said key pad coupled so as to enter data into said scratch pad and alternatively enter data directly into a first of a plurality of data fields in a graphical user interface, depending upon a predetermined selection characteristic of said first of a plurality of data fields.

13. A method of claim 12 wherein said predetermined selection characteristic is representative of a positive selection of a data field to receive direct data entry.

14. A method of claim 12 wherein said predetermined selection characteristic is representative of a lack of any positive selection of any of said plurality of data fields to receive direct data entry.

15. A method of claim 12 further including the steps of:

making a selection of a selected data field to receive data directly;

entering data directly into said selected data field.

16. A method of claim 12 further comprising the steps of:

entering data into said scratch pad when none of said plurality of data fields is selected.

17. An avionics system comprising:

a multi-functional display with a graphical representation of a line select key;

means for entering aviation data; and, means for temporarily storing aviation data and then transferring said aviation data to a display field, wherein said means for temporarily storing is a scratch pad.

* * * * *